United States Patent
Shahidzadeh et al.

(10) Patent No.: US 9,426,183 B2
(45) Date of Patent: Aug. 23, 2016

(54) AUTHENTICATION POLICY ORCHESTRATION FOR A USER DEVICE

(71) Applicant: Acceptto Corporation, Portland, OR (US)

(72) Inventors: Nahal Shahidzadeh, Portland, OR (US); Haitham Akkary, Portland, OR (US)

(73) Assignee: ACCEPTTO CORPORATION, Portland, OR (US)

( * ) Notice: Subject to any disclaimer, the term of this patent is extended or adjusted under 35 U.S.C. 154(b) by 0 days.

(21) Appl. No.: 14/444,865

(22) Filed: Jul. 28, 2014

(65) Prior Publication Data

US 2015/0033286 A1 Jan. 29, 2015

Related U.S. Application Data

(60) Provisional application No. 61/870,162, filed on Aug. 26, 2013, provisional application No. 61/859,285, filed on Jul. 28, 2013.

(51) Int. Cl.
G06F 21/00 (2013.01)
H04L 29/06 (2006.01)
G06Q 20/40 (2012.01)

(52) U.S. Cl.
CPC .......... *H04L 63/205* (2013.01); *G06Q 20/4014* (2013.01); *H04L 63/10* (2013.01); *H04L 2463/102* (2013.01)

(58) Field of Classification Search
None
See application file for complete search history.

(56) References Cited

U.S. PATENT DOCUMENTS

| | | | |
|---|---|---|---|
| 7,243,369 B2 * | 7/2007 | Bhat | H04L 67/02 713/182 |
| 7,721,322 B2 * | 5/2010 | Sastry | H04L 63/105 709/206 |
| 7,962,419 B2 * | 6/2011 | Gupta | G06Q 20/085 380/227 |
| 7,971,062 B1 | 6/2011 | Hughes et al. | |
| 8,127,142 B2 | 2/2012 | Cuppett | |
| 8,127,982 B1 * | 3/2012 | Casey | G06Q 20/35785 235/379 |
| 8,205,249 B2 | 6/2012 | Meister et al. | |
| 8,261,089 B2 | 9/2012 | Cobos et al. | |
| 8,346,924 B1 | 1/2013 | Bucher et al. | |
| 8,510,797 B2 | 8/2013 | Kasturi | |
| 8,510,811 B2 | 8/2013 | Kuang et al. | |
| 8,516,542 B2 * | 8/2013 | Lerner | G06F 9/546 709/223 |
| 8,572,714 B2 | 10/2013 | Radhakrishnan | |
| 8,612,357 B2 | 12/2013 | Phillips | |
| 8,756,661 B2 | 6/2014 | Levenberg | |
| 8,776,204 B2 | 7/2014 | Faynberg et al. | |
| 2003/0115142 A1 | 6/2003 | Brickell et al. | |
| 2004/0155101 A1 * | 8/2004 | Royer et al. | 235/379 |
| 2007/0011066 A1 * | 1/2007 | Steeves | 705/35 |
| 2007/0033136 A1 * | 2/2007 | Hu | 705/39 |

(Continued)

*Primary Examiner* — Farid Homayounmehr
*Assistant Examiner* — Maung Lwin
(74) *Attorney, Agent, or Firm* — Roark IP

(57) ABSTRACT

A system and method for authentication policy orchestration may include a user device, a client device, and a server. The server may include a network interface configured to be communicatively coupled to a network. The server may further include a processor configured to obtain, from a client device via the network, a transaction request for a transaction, determine an authorization requirement for the transaction request based, at least in part, on a plurality of authorization policies, individual ones of the plurality of authorization policies being separately configurable by at least one of a relying party and an authorizing party, and complete the transaction based on the authorization requirement having been met.

42 Claims, 7 Drawing Sheets

(56) References Cited

U.S. PATENT DOCUMENTS

| | | | |
|---|---|---|---|
| 2007/0156611 A1* | 7/2007 | Gupta | G06Q 20/02 705/78 |
| 2007/0262136 A1* | 11/2007 | Ou | 235/380 |
| 2009/0132808 A1* | 5/2009 | Baentsch et al. | 713/152 |
| 2009/0307135 A1* | 12/2009 | Gupta | G06Q 20/085 705/44 |
| 2010/0228996 A1* | 9/2010 | Ginter et al. | 713/189 |
| 2011/0035788 A1* | 2/2011 | White et al. | 726/4 |
| 2011/0086612 A1 | 4/2011 | Montz et al. | |
| 2011/0093927 A1* | 4/2011 | Leppanen | H04L 63/102 726/4 |
| 2011/0173017 A1 | 7/2011 | Salonen | |
| 2011/0173448 A1* | 7/2011 | Baentsch et al. | 713/169 |
| 2011/0288996 A1* | 11/2011 | Kreutz et al. | 705/44 |
| 2011/0296513 A1 | 12/2011 | Kasad | |
| 2011/0307949 A1* | 12/2011 | Ronda et al. | 726/9 |
| 2012/0192260 A1 | 7/2012 | Kontsevich | |
| 2012/0330788 A1* | 12/2012 | Hanson et al. | 705/26.41 |
| 2013/0007849 A1* | 1/2013 | Coulter | G06F 21/10 726/4 |
| 2013/0047202 A1 | 2/2013 | Radhakrishnan | |
| 2013/0047213 A1 | 2/2013 | Radhakrishnan et al. | |
| 2013/0111549 A1 | 5/2013 | Sowatskey | |
| 2013/0185205 A1* | 7/2013 | Boss et al. | 705/44 |
| 2013/0298242 A1 | 11/2013 | Kumar et al. | |
| 2013/0305322 A1* | 11/2013 | Raleigh | G06Q 30/016 726/4 |
| 2014/0040975 A1* | 2/2014 | Raleigh | H04W 12/12 726/1 |
| 2014/0189808 A1* | 7/2014 | Mahaffey | H04L 63/0853 726/4 |
| 2014/0189809 A1* | 7/2014 | Koved et al. | 726/4 |
| 2014/0189840 A1 | 7/2014 | Metke et al. | |
| 2014/0304795 A1 | 10/2014 | Bruno et al. | |

* cited by examiner

AUTHENTICATION POLICY ORCHESTRATION FOR A USER DEVICE

PRIORITY

This application claims priority to U.S. Provisional Patent Application 61/859,285, filed on Jul. 28, 2013, and to U.S. Provisional Patent Application 61/870,162, filed on Aug. 26, 2013, both of which are incorporated herein in their entirety.

TECHNICAL FIELD

The subject matter disclosed herein generally relates to authentication policy orchestration for use on a user device.

BACKGROUND

Digital transactions of a variety of types may stem not from a party authorized to enter in to the transaction but by parties that are either unauthorized to enter in to the transaction or bad actors who have acquired the means to enter in to the transaction illegally. For instance, a stolen credit card number or bank account access may be utilized to make fraudulent purchases. A stolen or compromised password may be utilized to improperly access information. Even conventional purchases or activities within an organization may be engaged in by an employee or member who does not have authorization to do so; certain purchases may be initiated by one party, such as a regular employee, but require authorization by a second party, such as a manager.

BRIEF DESCRIPTION OF THE DRAWINGS

Some embodiments are illustrated by way of example and not limitation in the figures of the accompanying drawings.

DETAILED DESCRIPTION

Example methods and systems are directed to authorization policy orchestration. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Services exist that allow for the authentication of electronic transactions, including financial transactions, the accessing of electronic data, accessing physical spaces (e.g., by opening a lock), and conveyances of identity (e.g., a social security number or other personal information). If a transaction is entered into using a credit card the primary owner or user of the credit card may be separately prompted for authorization to complete the transaction; if authorization is not granted then the transaction may be cancelled or otherwise not completed. Filters may prevent minor transactions from necessarily requiring authorization. For instance, a relatively inexpensive credit card purchase may not require authorization.

However, such authorization services may be unresponsive to the circumstances in which a transaction is entered into and the circumstances of the authorizing party. Such factors may, alone or in combination, indicate that authorization may or may not be needed or that a transaction should simply be blocked even without input by the authorizing party. A system has been developed that includes authorization policy orchestration that may factor in endogenous and exogenous factors to conditionally require authorization of transactions. Such conditional authorization may utilize varying degrees of authorization depending on such conditions and varying and/or adding authorizing entities, including providing for the authorization of a party who is not necessarily able to engage in the transaction in the first instance. Such conditional authorization may also utilize multiple authorizations of discrete or particular components of a single transaction or multiple transactions in order to provide authorization for the transaction as a whole.

Figure 1:
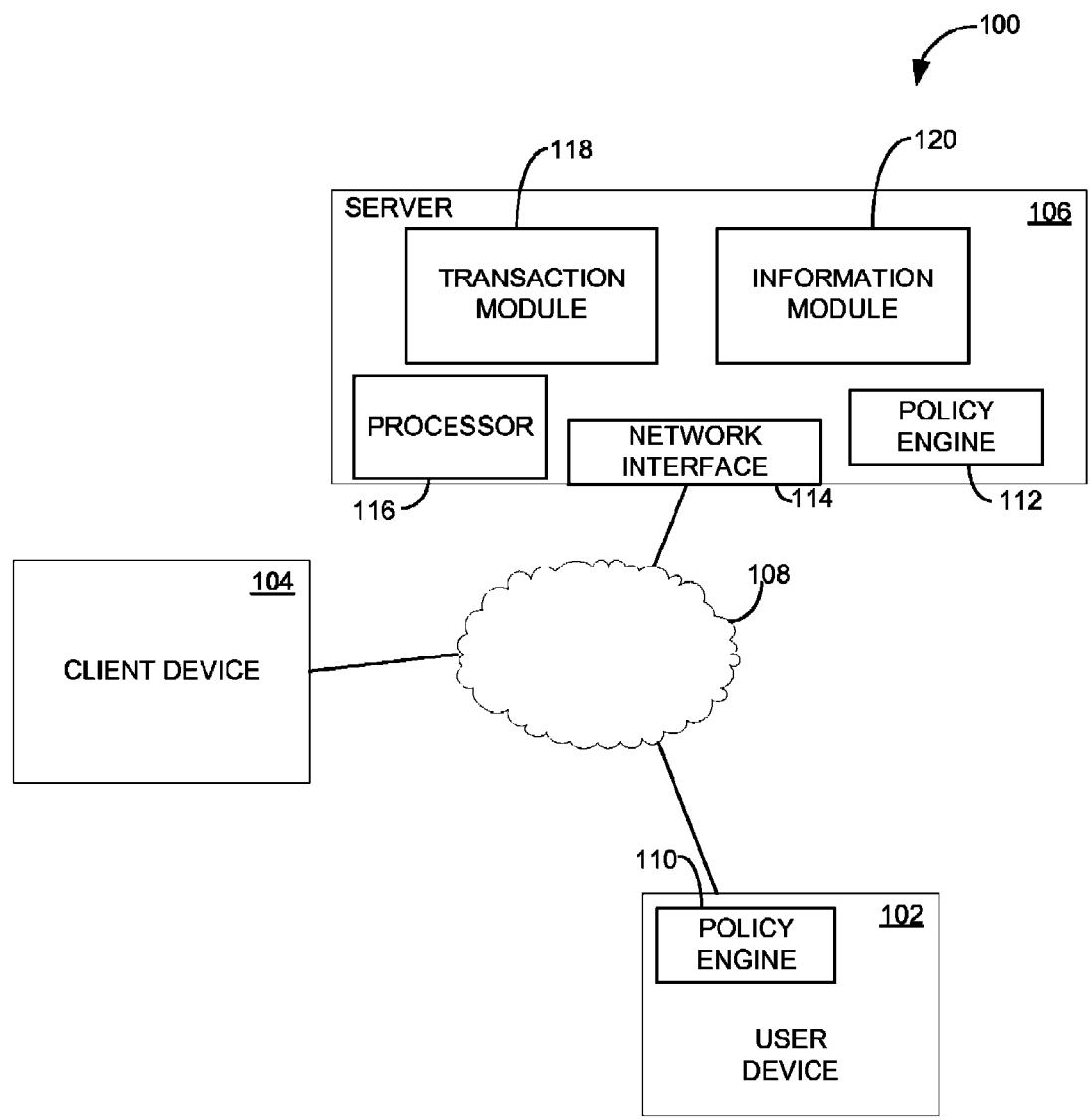
FIG. 1 is a system diagram of a system including a user device, a client device, and a server, in an example embodiment

FIG. 1 is a system diagram of a system 100 including a user device 102, a client device 104, and a server 106, in an example embodiment. The user device, client device 104, and server 106 are communicatively coupleable with respect to one another via a network 108. The network 108 may be the Internet or any other suitable public or private data network. The network 108 may include or be accessed by WiFi, Bluetooth, radio-frequency identification (RFID), near field communications (NFC), and so forth. The system 100 may provide customer and transaction authentication based, at least in part, on policy orchestration, as disclosed herein.

The user device 102 may be any suitable electronic, computational, and/or communication device that may be utilized by an authorizing party who may provide a mechanism authorization for a transaction as described herein. An authorizing party may be one or more individuals, and in an example a single individual, who is authorized to approve a given transaction. The user device 102 may be a mobile device, such as a cellular phone, a smartphone, a personal digital assistant, a wearable device (e.g., a smart watch, smart glasses, smart tattoo or embedded devices and the like), a tablet computer, a laptop computer, video game devices, or any other mobile device that may communicate with the network 108. The user device 102 may additionally or alternative be an electronic device which is not conventionally mobile, such as a desktop computer and the like.

In an example, the user device 102 may consistently be a particular, designated electronic, computational, and/or communication device associated with an authorizing party. The user device 102 may be registered to a particular authorizing party. For instance, a smartphone of the authorizing party may be designated as the user device 102 with authorization requests routed to that user device 102. In an example, the designated user device 102 may be the only device to which the authorization request is routed.

Alternatively, the user device 102 may incorporate or function on multiple electronic devices or may be any of a variety of electronic devices an authorizing party happens to be using at the time an authorization request is obtained for the user. In an example, an authorization request may be transmitted to some or all of an authorizing party's regular electronic devices, such as a phone/smartphone, a wearable device, and a personal computer. Additionally or alternatively, the system 100 may be sensitive to which electronic devices corresponding to the authorizing party are currently in operation. For instance, if an authorizing party has an operational smartphone and is currently logged in to a personal computer then an authorization request may be displayed on those two electronic devices but not on a tablet computer that is not currently operating.

The client device 104 may be an electronic device on which a transaction for which authorization is required is initiated by a transacting party. The client device 104 may be any suitable electronic, computational, and/or communication device for conducting such a transaction, such as mobile devices as disclosed herein, personal computers, cash registers, kiosks, order terminals, electronic locks, automobile locks, or any location or device on which a party may seek to access an electronic location, a physical location, personal information, or other location or item having restricted access. As such, while such a client device 104 may have a user input device, such as a keyboard or keypad, the user input terminal would not necessarily have the capacity to display messages to a party attempting to enter into the transaction.

The server 106 may be operated by or for the benefit of a relying party, such as a financial institution (bank, credit card company and the like), retailer, information or data storage provider, or any party that may offer a service or control access to a location or thing for which attempts to engage by a transacting party may be authorized or authenticated by an authorizing party. The relying party may be a party with an interest in the transaction who is neither an initiator nor approver of the transaction. The relying party may alternatively be or may be replaced with a manager or workflow that may be empowered to establish policies without having an interest in the transaction. For instance, a media content provider may provide a mechanism for parental control over the content displayed. In such an example, the media content provider may control the server and establish parental controls that may be modified by the parents, who may function as the authorizing party, and utilized to approve or reject content accessed by children of the parents, who may be considered the transacting parties.

The server 106 may, in various examples, be a Machine to Machine Digital Key Authentication (M2M-DKA) server and may utilize a secure communication protocol over the network 108. The sever 106, and the system 100 generally, may provide an integrated per-customer contextual pattern detection for a relying party and the customers enabling transparency and detection of attacks and leakage of secure information.

In the illustrated example, the user device 102 and the server 106 incorporate a user policy engine 110 and a relying party policy engine 112, respectively. The policy engines 110, 112 may establish policy orchestration for the system 100 generally. In various examples, the user policy engine 110 and the relying party policy engine 112 may operate as a single policy engine for the system as a whole 100. Such a single policy engine may be provided by the server 106 but may receive policy directions from the user device 102. In various examples, the user policy engine 110 may establish policy orchestration for policies concerning how and under what circumstances an authorizing party may be presented with authorization requests, including circumstances in which an authorization request may be automatically approved or rejected. In various examples, the relying party policy engine 112 may establish policy orchestration for policies concerning the circumstances in which an authorizing party may be required to authorize a transaction.

In the illustrated example, the server 106 includes a network interface 114 coupleable to the network 108 and a processor 116. The processor 116 may be configured to implement the relying party policy engine 112 as well as a transaction module 118 configured to complete a transaction based on a transaction request as received from the client device 104 pursuant to an authorization requirement having been met, the authorization requirement having been obtained based on the authorization policies as disclosed herein. The transaction module 118 may further provide automatic authorizations or rejections based on the authorization policies. The processor 116 may further be configured to implement an information module 120 configured to transmit information to and receive information from the user device 102, such as authorization requests and responsive authorization approvals or rejections.

Figure 2A:
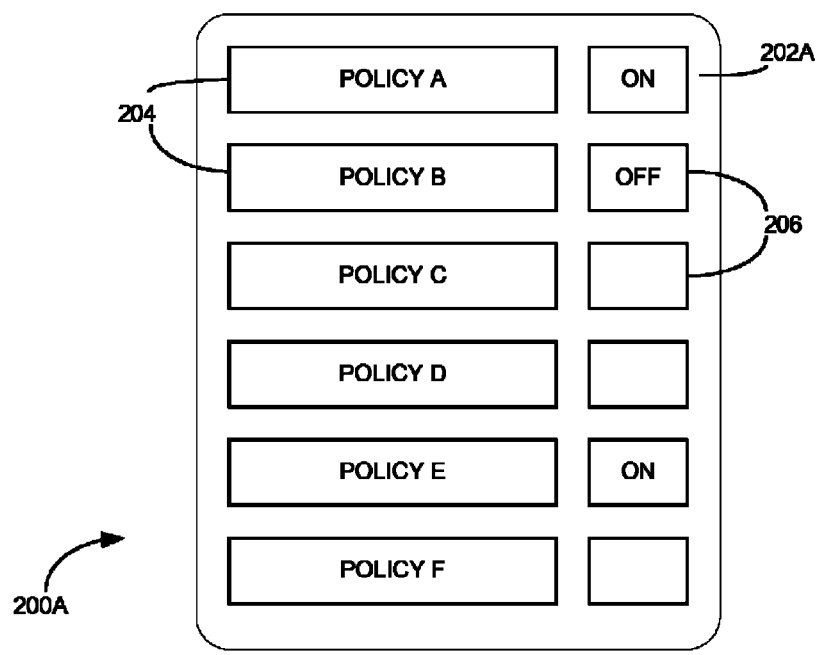
FIGS. 2A and 2B are screenshots of policy orchestration menus, in an example embodiment.
Figure 2B:
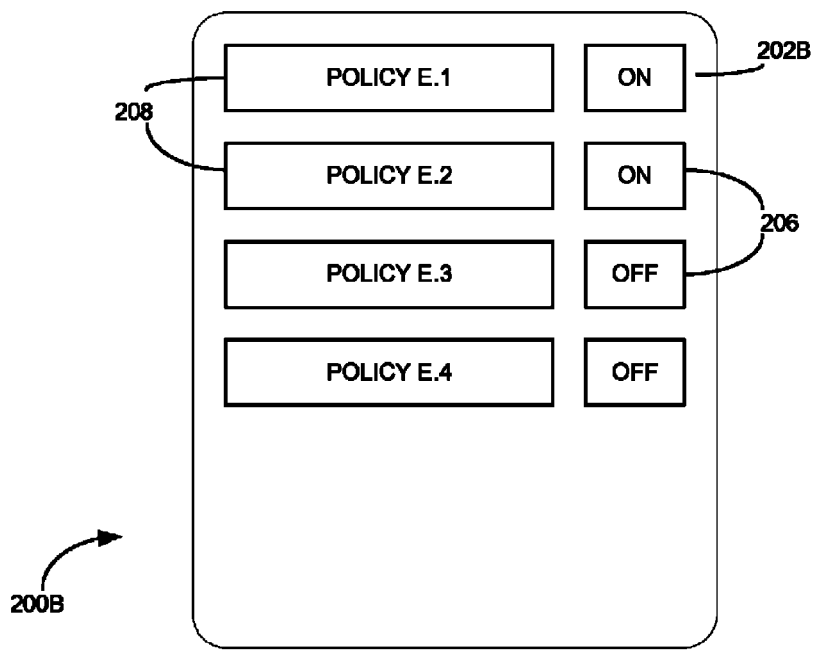

FIGS. 2A and 2B are screenshots 200A, 200B, respectively, of policy orchestration menus 202A, 202B, in an example embodiment. The policy orchestration menus 202A, 202B may be displayed on the user device 102, a user interface of the server 106, or any electronic, computational, and/or communication device configured to provide information to or receive information from one or both of the user device 102 and the server 106. As illustrated in FIG. 2A, individual first-level policies 204 may be selected or deselected with the associated boxes 206 or other form of selection, such as pick boxes, radio buttons and the like. The selection of such boxes 206 may then produce second-level policies 208 that derive from or further define the first-level policies 204, as displayed in FIG. 2B. Thus, as illustrated, the selection the box 206 of "Policy E" in the policy orchestration menu 202A may lead to the policy orchestration menu 202B and the display of second-level policies 208 related to "Policy E". Example of second-level policies will be detailed herein.

The boxes 206 may provide for binary on/off selection or may be utilized to specify parameters or applicable items, accounts, locations, and the like. Thus, the boxes 206 may be utilized to enter a currency amount, an identification of a computer or other device functioning as a client device 104, a geographic location, and so forth. The boxes 206 in such examples may include sliding scales to allow for the graphical selection of amounts over a range, a drop-down menu or other form of menu to select among a list of options, or an alphanumeric entry line to directly enter a specific amount, location, or identity, as appropriate. The boxes 206 may also allow for relative levels of the application of policies. Thus, for instance, a box 206 may allow for the selection of or between and among "low", "medium", or "high" risk factors that may correlate to policies that are not necessarily directly visible to the user.

Policy orchestration may factor in multiple policies as set by the authorizing party/parties and/or by the relying party in order to determine the circumstances under which an authorization request is transmitted to one or more authorizing parties and to which authorizing parties the authorization request is transmitted. As many polices as have been set may be utilized in determining the circumstances and destination of an authorization request. In an example, policies set by the relying party may take precedence over policies set by the authorizing party if such policies conflict as the relying party may in the end be primarily responsible for losses arising from the transaction. Thus, a relying party that is a financial institution may, based on risk factors, require authorization even if the authorizing party has selected automatic approval for a transaction based on those risk factors.

In an example, the user policy engine 110 may be utilized to orchestrate policies as selected by the authorizing party. In various examples, the authorizing party may be enabled to select policies including, but not necessarily limited to: multiple authorizing parties; device status; multiple transacting parties and/or multiple client devices 104; notification vs. authorization; location; transaction amount; network; token; biometric; personal identification number (PIN); message delivery mechanism; proximity; and timeout/serial rejection. In various examples, the relying party policy engine 112 may be utilized to orchestrate policies as selected by the relying party. In various examples, the relying party may be enabled to select policies including, but not necessarily limited to: multiple authorizing parties; device status; multiple transacting parties and/or multiple client devices 104; notification vs. authorization; location; transaction amount; habits; context; biometric; risk factors; message delivery mechanism; authorization method, proximity; and timeout/serial rejection. These various policies will be described in detail herein.

Figure 3:
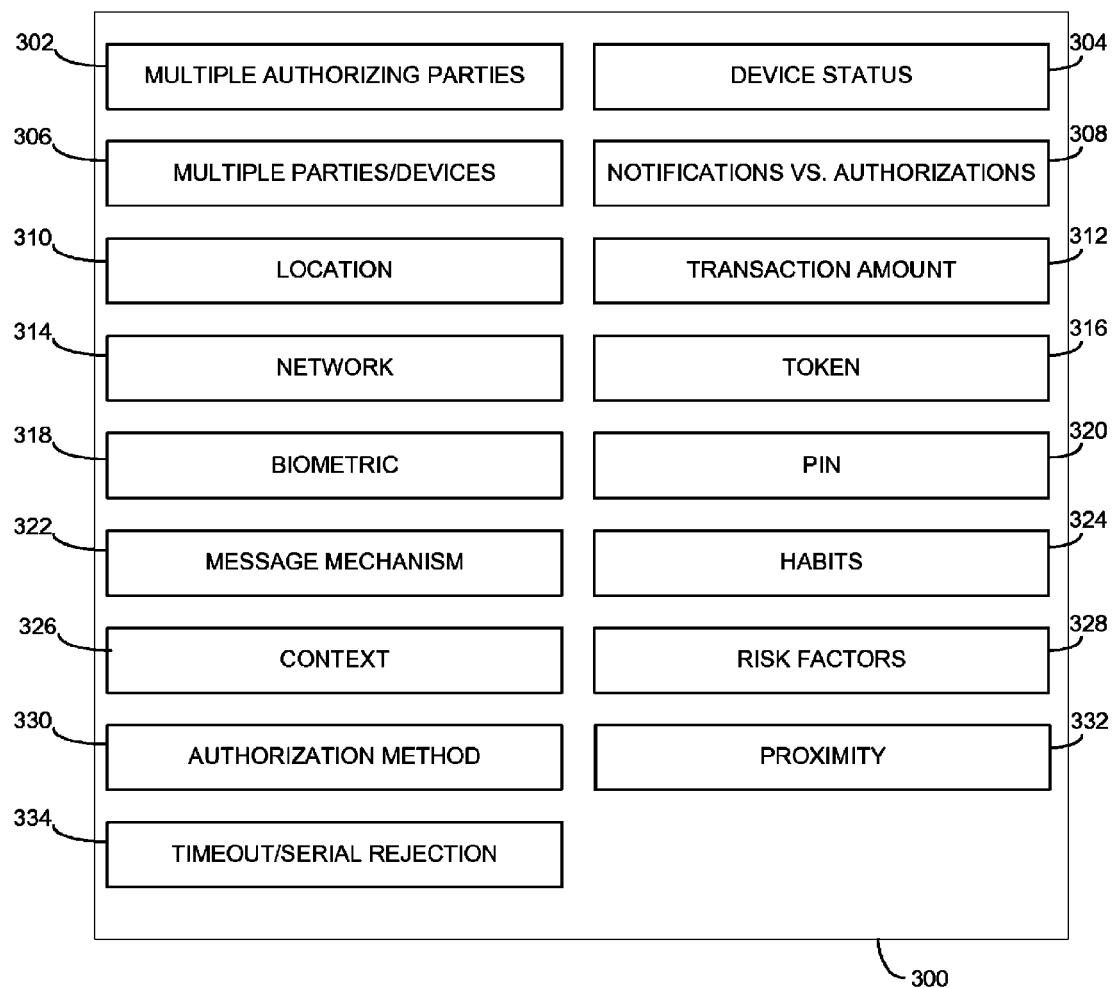
FIG. 3 is a block diagram of a policy engine 300, in an example embodiment.

FIG. 3 is a block diagram of a policy engine 300, in an example embodiment. The policy engine 300 may be the user policy engine 110, the relying party policy engine 112, or a consolidation of the user policy engine 110 and the relying party policy engine 112. The policy engine 300 may include one or more authorization policies as detailed herein.

The multiple authorizing parties policy 302 may set a requirement for multiple authorizing parties for a single transaction. Authorization requests may fork out to individual authorizing parties to be acted on independently by each authorizing party. In an example, the multiple authorizing parties policy may be instituted by either the relying party or the authorizing party. Thus, a relying party may choose to require multiple authorizing parties for a particular transaction or the authorizing party may determine that a particular transaction may require multiple authorizing parties. In an example, if either the relying party or the authorizing party require multiple authorizing parties then the multiple authorizing parties policy may be set for the transaction. In selecting the multiple authorizing party policy, the selecting party may establish which authorizing parties may be required to approve the transaction.

In the event the multiple authorizing parties policy is set, an authorization request may be sent to a user device 102 uniquely registered to each authorizing party. The transaction may not be authorized until and unless each authorizing party provides authorization and, in an example, a single authorizing party withholding authorization may cause the transaction to be rejected. In such an example, then, the system 100 may incorporate multiple user devices 102 and each user device 102 may be registered to one or more authorizing parties. In an example, each user device 102 is uniquely registered to one and only one authorizing party.

Upon each authorizing party having approved the transaction the transaction is authorized and completed. As noted above, in various examples a single authorizing party rejecting the transaction or failing to authorize the transaction may cause the entire transaction to be rejected. In various additional or alternative examples, the multiple authorizing parties policy may stipulate a number or percentage of authorizing parties that may be sufficient to authorize a transaction that requires less than unanimity among the authorizing parties. For instance, in an example, the approval of two out of four authorizing parties may be sufficient to approve the transaction.

The multiple authorizing parties policy may be utilized to establish a hierarchy for approvals and approving parties. In an example, one or more authorizing parties may be given a veto over a transaction. In an example, the approval of one authorizing party may be required, such as by a supervisor, while not necessarily all other authorizing parties may be required to also approve the request, such as one out of four subordinates to the supervisor. In an example, a superior authorizing party who withholds approval but does not reject the transaction may not block a transaction if other authorizing parties approve the transaction but may block the transaction if the transaction is affirmatively rejected.

The device status policy 304 may be utilized in determining which of one or more user devices 102 associated with one or more authorizing parties should have authorization requests transmitted to them. If a user device 102 is known to be locked or lost, for instance, and the locked or lost user device 102 is the only user device 102 associated with or registered to a particular authorizing party, then transactions requiring authorization may be automatically rejected until the user device 102 is recovered or unlocked. In additional examples, if a single authorizing party has multiple user devices 102 registered and one of those user devices 102 is currently actively being used by the authorizing party while the other user devices 102 are locked or shut down then the authorization request may be displayed on the active user device 102. Alternatively, the policy may require that each authorization request be sent to each user device 102 registered to an authorizing party. Additionally or alternatively, if all user devices 102 registered to an authorizing party are locked or shut down then an authorization request may be forwarded to an alternative authorizing party for approval or may be automatically approved or rejected, as appropriate.

The multiple transacting parties and/or multiple client devices 104 policy 306 may allow for the authorizing party and/or the relying party to specify that transactions may be provided from a single client device 104 and/or a single transacting party or from multiple client devices 104 and/or multiple transacting parties. For instance, if a particular transaction is linked to only a single transacting party and/or client device 104 then if the transaction originates from a different transacting party and/or client device 104 then the transaction may be rejected without transmitting an authorization request to the authorizing party.

The notifications vs. authorizations policy 308 may establish the parameters for whether or not notifications are transmitted when a notification may be substituted for an authorization request. In various examples disclosed herein, an authorization request may not be necessary for a particular transaction because of one or more policies rendering the authorization request unnecessary for various reasons, such as because the transaction is automatically approved or automatically rejected. Additionally or alternatively, an individual of interest to the transaction may desire to be informed of the transaction without being an authorizing party. For instance, a transaction entered into by a child may be subject to notification to a parent without necessarily requiring authorization. Thus, notification messages may provide notice to any of a variety of parties that, for instance, a transaction has been automatically approved, a transaction has been automatically rejected, a transaction has been approved by an authorizing party, a transaction has been rejected by an authorizing party, a transaction has been initiated but not yet approved or rejected, and the like. Thus, the selection of notifications may provide such notifications while the selection of authorizations may provide messages relating to a transaction only in the form of authorization request.

The location policy 310 may allow for the automatic rejection or approval of transactions depending on the physical location of one of the parties to the transaction, such as the transacting party or the authorizing party. Such a location may be determined based, at least in part, on a location of an associated client device 104 or user device 102, respectively. Thus, for instance, if a credit card transaction purporting to be from a particular transacting party originates from a client device 104 physically located some distance from the purported transacting party then the credit card transaction may be rejected automatically without the transmission of an authorization request to the authorizing party. Relatedly, a location may be a trusted location wherein, if a transaction originates from a predetermined trusted location, such as from a particular office, store, residence, and so forth, then the transaction may be authorized automatically. Additionally, an authorizing entity may be a trusted authorizing entity that may have transactions originate from multiple locations, such as by a utility or mortgage provider or other financial institution and transactions related thereto may not be subject to location restrictions.

The location policy 310 may have second-level policies and/or the capacity to set up various locations or zones. For instance, a first zone may be established that is a particular client device 104 or within a certain range of particular location and transactions originating from that zone may be automatically approved. A second zone may be set up that provides for automatic authorization with notification, as disclosed herein. A third zone may be set up that provides for automatic approval of transactions that are less than a certain limit, and so forth. Such second-level policies and the establishment of zones may be made in the policy orchestration menu 202B.

The transaction amount policy 312 may provide automatic authorization for transactions depending on the value of the transaction or the value of the subject of the transaction. For instance, a transaction for less than a predetermined amount of money may be automatically authorized. The limit may be a daily amount, with all transactions up to a cumulative level, for instance one thousand dollars, automatically approved but additional daily transactions may require authorization. Similarly, a fixed number of logins may be automatically approved but subsequent logins may require authorization. Relatedly, a transaction for greater than a predetermined amount of money may be automatically rejected. Transactions not above or below a predetermined amount may be subject to an authorization request to the authorizing party or parties. The transaction amount may also pertain to various goods or the relative value of a password-protected are. Thus, a relatively low-security location may not require authorization by an authorizing party but a relatively high-security location may require authorization. Similarly, restricted items, such as liquor or tobacco products, may have more significant monetary restrictions than non-restricted or regulated products.

The transaction amount policy 312 may include second-level policies for establishing transaction amounts for individual accounts, data locations, personal information, and the like. For instance, a maximum transaction amount for a first credit card may be different than the maximum transaction amount for a second credit card, and both may be different for the maximum transaction amount of a bank checking account. Maximum numbers of accesses of an electronic data location may similarly be set, and so forth.

The network policy 314 may factor in the availability of the network 108 in requiring authorization and/or in how authorization is requested. In an example, if the network is unavailable then a transaction that may otherwise require authorization may be completed without authorization. The network policy 314 may further factor in network usage, where a number of transactions may be automatically authorized over a predetermined period of time, such as one day, but additional transactions may be subject to authorization. Additionally or alternatively, a notification may be sent to the authorizing party by an alternative communication modality. For instance, a notification may be sent to the authorizing party via a separate cellular network, such as in the form of a text message, phone call, email, and the like. In various examples, the notification may provide the ability for the authorizing party to seek an alternative communication modality in order to cancel the transaction, provide explicit authorization, or provide transaction feedback that may be utilized for post hoc fraud investigations.

The token policy 316 may remove the need for authorization or may supplement authorization if the client device 104 includes designated security token as known in the art. In an example, the token may tend to establish that the client device 104 is a trusted device. The owner of the client device 104 may know the token or be able to access the token. Additionally or alternatively, the token may be assigned to the particular transacting party and the transacting party may load the token into the client device 104 prior to initiating the transaction. The token may, in certain non-limiting examples, be a pre-authorized picture transfer protocol (PTP) token or a time-based one time password (TOTP) token, among any of a variety of suitable tokes and protocols.

The biometric policy 318 may allow for the use of biometric information to either not require authorization for the transaction or to provide authorization by the authorizing party. In an example, a transacting party may be required to provide biometric information to establish their identity. Having provided the biometric identification, the resultant transaction may not need to be authorized by an authorizing party. In an alternative example, the provision of biometric information may merely be an additional layer of security and the transaction may still be subject to authorization by the authorizing party. In an alternative example, the authorizing party may provide authorization by inputting biometric information. In various examples, the biometric policy 318 may provide security in addition to other security protocols, in which case the biometric policy 318 may provide security augmentation, or may replace other security protocols, in which case the biometric policy 318 may provide a relatively more convenient security mechanism than certain other protocols. The biometric policy may include second-level policies for the selection of particular biometric requirements, such as to require fingerprint but not voice recognition, and so forth.

The PIN policy 320 may allow for the use of a PIN as part of authentication of the transaction. As with the biometric policy 318, the PIN may obviate the need for authorization, may be required in addition to authorization, and/or may be utilized as part of the authorization by the authorizing party. The PIN may be associated with the party using the PIN or may be associated with a transaction, e.g., each transaction or group of related transactions may have a separate PIN and in order to enter in to the transaction the PIN must be entered.

The message delivery mechanism policy 322 may establish how authorization requests are transmitted to the authorizing party. Authorization requests (as well as notifications) may, in various examples, be transmitted to the authorizing party via a dedicated software application, via cellular communication mechanisms, such as text messages and voice messages, via electronic mail, via, web-based messages, and the like. The message delivery mechanism policy 322 may establish which modalities various messages, such as authorization requests and notifications, are sent to the authorizing party. In an example, an authorization request is transmitted to the dedicated software application while a notification is transmitted via text message. Various individual modalities and combinations of modalities may be selected as appropriate.

The habits policy 324 may track habits of the transacting party and/or the authorizing party in order to provide automatic authorization or rejection of transactions. For instance, if a transacting party routinely makes a regular purchase of a regular amount and that purchase is routinely authorized by the authorizing party then the routine purchase may cease to require authorization. Or if a transacting party routinely accesses a particular communication modality at certain times of the day or in a certain order (e.g., accesses WiFi at home followed by utilizing a cellular network for approximately twenty minutes on the way to an office and WiFi again at the office) may establish an elevated level of trust. The relying party may establish what constitutes sufficient examples to form a habit; for instance, relatively more routine instances may provide for more security as well as greater burden on the authorizing party.

The context policy 326 may factor in the context of the transaction in order to determine if authorization is required. For instance, if a transacting party is a purchasing agent at an automotive parts store then transactions for purchasing auto parts may not require authorization while a transaction for purchasing food items may require authorization. The context policy may provide for varying other policies. For instance, in the above example, the context policy 326 may provide that the transaction amount policy 314 may include a first amount for the purchase of auto parts and a second, higher amount for the purchase of food items.

The risk factors policy 328 may factor in risk factors related to the transaction in order to determine if authorization is required. The risk factors may incorporate information from other policies as well as information not considered by other policies. Thus, for instance, a transaction conducted in one city may not require authorization under other policies, and a different transaction conducted in a second city may not require authorization under other policies, but the risk factor policy 328 may note that a travel time between those cities may not have been possible or may have been impractical given the timing between those two transactions and thus require authorization for the transaction from the second city.

The authorization method policy 330 may require various authorization mechanisms for a particular authorizing party and/or a particular transaction or transaction type. For instance, a first authorizing party may be required to input a PIN or provide biometric authentication while a second authorizing party may not require a security token, and so forth. Alternatively, particular transactions or transaction types may require various authentication methods. Thus, a transaction exceeding a predetermined amount may require authentication with a PIN or biometric authentication while transactions below the predetermined amount may simply be sent to the authorizing party without requiring separate authentication by the authorizing party.

The proximity policy 332 may provide for the automatic authorization of transactions if the transactions are entered into where the user device 102 is within a predetermined proximity of the client device 104. In an example, if the user device 102 is known to be within thirty meters of the client device 104 during a credit card transaction then it may be deemed that the owner of the credit card was using the credit card appropriately.

The timeout/serial rejection policy 334 may provide for the automatic acceptance or rejection, as appropriate, of future transactions following a timeout for previous authorization requests or for the serial rejection of previous authorization requests. For instance, if an authorizing party has not responded to an authorization request within a selected timeframe, such as one or more hours, then future transaction requests may either automatically be authorized or rejected depending on the setting of the policy. Similarly, if an authorizing party has serially rejected multiple transactions then future transactions, such as transaction similar to the rejected transactions, may be automatically rejected.

The implementations for the policies described above are for example only and one of ordinary skill in the art will readily recognize how such policies may individually be adapted to any of a variety of circumstances and any of a variety of transactions. The policies may similarly be combined, as mentioned above in various specific examples but also without substantial limit. Each policy may control circumstances in which the policy uniquely applies. Thus, other policies notwithstanding, the network policy 314 may control in circumstances of network disruption, the habits policy 324 may override a PIN or biometric policy, a daily maximum amount for automatic allowance under the transaction amount policy 312 may override the notifications vs. authorizations policy 308, and so forth.

Similarly, policies established by the relying party may override policies established by the authorizing party. Thus, if the authorizing party establishes a biometric policy that is at odds with the biometric policy of the relying party the biometric policy of the relying party may control. A party may decline to establish a policy in the first instance. Thus, the relying party may not have a biometric policy while the authorizing party may have a biometric policy, in which case the authoring party's biometric policy may control.

Certain policies are described as having second-level policies. However, it is to be understood that any or all of the policies may include or access second-level policies as may be necessary or useful in defining the implementation parameters of the first-level policies.

Figure 4A:
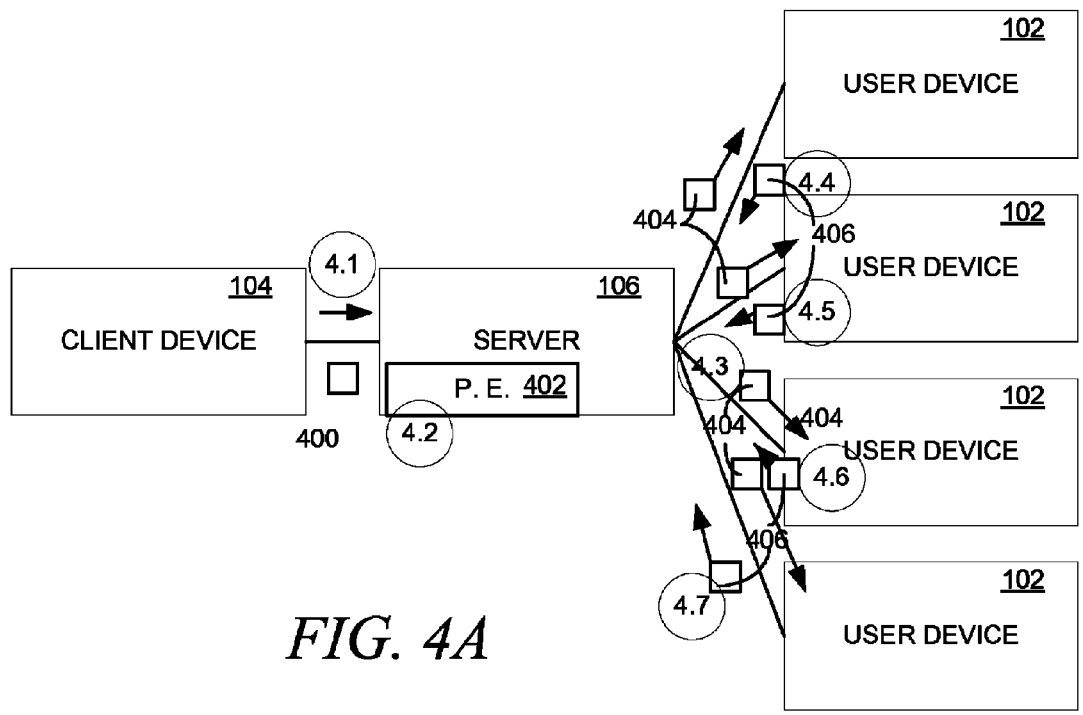
FIGS. 4A and 4B are flow diagrams for multiple authorizing parties, in example embodiments.
Figure 4B:
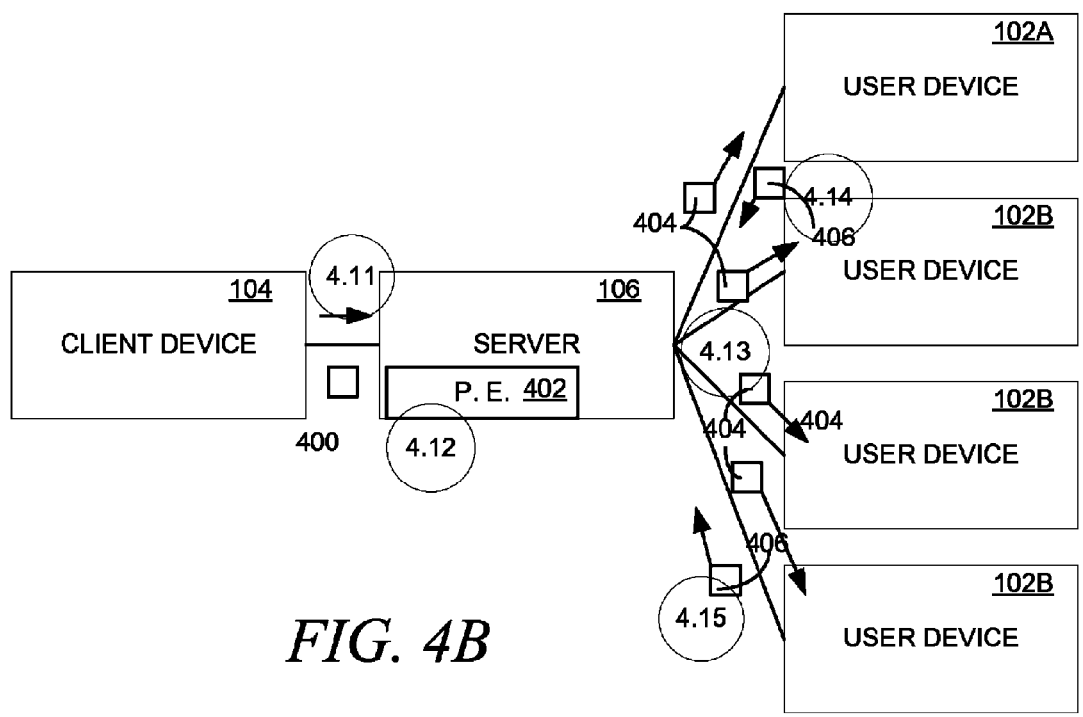

FIGS. 4A and 4B are flow diagrams 400A, 400B, for multiple authorizing parties 402, in example embodiments.

In FIG. 4A a client device 104 transmits (4.1) a transaction request 400 to the server 106. A policy engine 402 that includes the authorizing party policy engine 110 and the relying party policy engine 112 determines (4.2) an authorization requirement for the transaction request based on the authorization policies then selected in comparison with the transaction request. If the authorization requirement mandates authorization by multiple authorizing parties, the information module transmits (4.3) authorization requests 404 to multiple user devices 102 registered to or otherwise associated with the authorizing parties from which authorization is to be requested. At each user device 102 authorizing parties may consider the authorization request 404 and approve or reject the authorization request, upon which the user devices 102 separately transmit (4.4, 4.5, 4.6, 4.7) authorization responses 406 as provided by the authorizing parties.

In various examples, upon receiving all of the authorization responses 406 or, additionally or alternatively, upon an expiration of a predetermined time to receive the authorization responses 406, the transaction module 118 may complete the associated transaction based on a comparison of the authorization responses 406 to the authorization requirement. For instance, if the authorization requirement requires approval by all of the authorizing parties then the transaction module 118 may complete the transaction by implementing the transaction if all of the authorization responses 406 are approvals or by rejecting the transaction if any one or more of the authorization responses 406 are a rejection. Alternatively, if the authorization requirement does not require unanimous approval, for instance by requiring majority approval, then the transaction module 118 may implement the transaction if more than half of the authorizing parties approved the transaction and reject the transaction if half or fewer of the authorizing parties approved the transaction. In an example in which the authorizing parties have equal authority to authorize a transaction, such as a married couple, the authorization of any one authorizing party may allow for the transaction to be completed notwithstanding a rejection by another one or even all of the other authorizing parties.

The example of FIG. 4A provides for the authorizing parties being equal rather than hierarchical. In FIG. 4B, the authorizing parties are hierarchical, with a first user device 102A corresponding to a superior authorizing party and other user devices 102B corresponding to inferior authorizing parties. In various examples, the authorizing parties may obtain authorization requests concurrently or simultaneously. Alternatively, the authorizing parties may receive the authorizing parties may receive requests according to a specific sequence, such as according to reverse seniority with the superior authorizing party receiving the authorization request last and after the inferior authorizing parties have provided authorization.

The client device 104 transmits (4.11) a transaction request 400 to the server 106. A policy engine 402 that includes the authorizing party policy engine 110 and the relying party policy engine 112 determines (4.12) an authorization requirement for the transaction request based on the authorization policies then selected in comparison with the transaction request. If the authorization requirement mandates authorization by multiple authorizing parties, the information module transmits (4.13) authorization requests 404 to multiple user devices 102 registered to or otherwise associated with the authorizing parties from which authorization is to be requested. At each user device 102 authorizing parties may consider the authorization request 404 and approve or reject the authorization request, upon which some but not all of the user devices 102 separately transmit (4.14, 4.15) authorization responses 406 as provided by the authorizing parties.

In the illustrated example, the transaction engine 118 may complete the transaction by rejecting the transaction if the superior authorizing party rejects the transaction without respect to the responses by the inferior authorizing parties. Thus, for instance, a parent may be the superior authorizing party on a child's credit card or bank account, while the child may be an inferior authorizing party. In various examples, the transaction engine 118 may approve the transaction if the superior authorizing party approves the transaction and any one inferior authorizing party approves the transaction without respect to other authorization responses 406 by other inferior authorizing parties. It is to be noted and emphasized that this example is illustrative and other hierarchical relationships between and among the authorizing parties are contemplated and may be implemented as appropriate based on the authorization policies.

Figure 5:
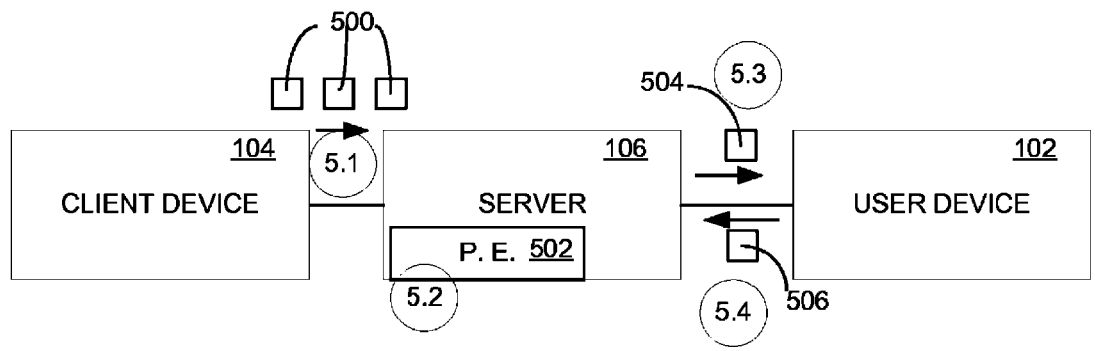
FIG. 5 is a flow diagram for multiple transaction consolidation, in an example embodiment.

FIG. 5 is a flow diagram 500 for multiple transaction consolidation, in an example embodiment. In an example, a transacting party enters multiple transactions at a client device 104. (It is noted that while a single client device is illustrated, the principles illustrated here apply equally well to the consolidation of transactions obtained at multiple client devices 104.) The client device 104 transmits (5.1) multiple transaction requests 500 to the server 106. The transaction requests 500 may stem from transactions that are independent of one another, such as when a purchasing agent enters into multiple otherwise unrelated transactions, or may stem from a common event, such as an open tab at a restaurant or bar. The multiple transaction requests 500 may be based on an elapsed time (e.g., over a two hour window or subject to other termination criteria), a deliberate selection to group the particular transaction requests 500 together, or any of a variety of other criteria. A policy engine 502 that includes the authorizing party policy engine 110 and the relying party policy engine 112 determines (5.2) an authorization requirement for the transactions request based on the authorization policies then selected in comparison with the transaction requests. In the illustrated example, the policy engine 502 determines that the transaction requests 500 may be consolidated into a single request, for instance because the transaction requests involve multiple purchases of the same or similar item or for the same or similar price.

The information module transmits (5.3) an authorization request 504 to the user device 102 registered to or otherwise associated with the authorizing party from which authorization is to be requested. At the user device 102 the authorizing party may consider the authorization request 504 and approve or reject the authorization request, upon which the user device 102 transmits (5.4) the authorization response 506 as provided by the authorizing party. The transaction engine 118 may complete all of the transactions based on the single authorization response 506, such as by implementing the transactions if the authorization response 506 is an approval and by rejecting all of the transactions if the authorization response 506 is a rejection.

Figure 6:
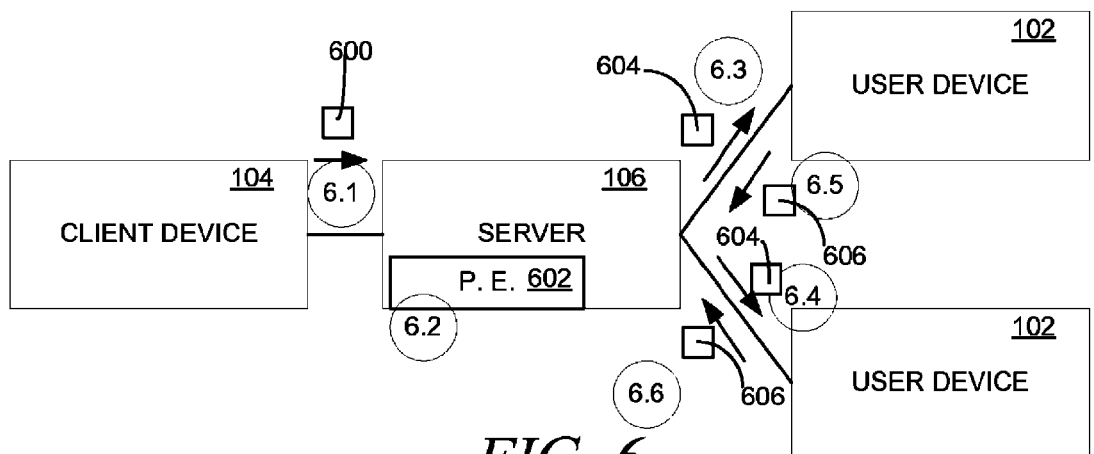
FIG. 6 is a flow diagram for generating individually-reviewable sub-transactions from a single transaction request, in an example embodiment.

FIG. 6 is a flow diagram 600 for generating individually-reviewable sub-transactions from a single transaction request, in an example embodiment. A client device 104 transmits (6.1) a transaction request 600 to the server 106. A policy engine 602 that includes the authorizing party policy engine 110 and the relying party policy engine 112 determines (6.2) an authorization requirement for the transaction request based on the authorization policies then selected in comparison with the transaction request. In the illustrated example, the policy engine 602 determines that the transaction request may be divided into sub-transactions that may be separately subject to approval, for instance because the transaction is for the purchase of an article and that a first authorization party may approve the acquisition of the article while a different second authorization party may approve the expenditure. The information module transmits (6.3) a first authorization request to a user device 102 registered to or otherwise associated with the first authorization party and a transmits (6.4) a second authorization request to a user device 102 registered to or otherwise associated with the second authorization party. At each user device 102 authorizing parties may consider the authorization requests 604 and approve or reject the authorization requests 604, upon which the user devices 102 separately transmit (6.5, 6.6) authorization responses 606 as provided by the authorizing parties.

In various examples, upon receiving all of the authorization responses 406 or, additionally or alternatively, upon an expiration of a predetermined time to receive the authorization responses 606, the transaction module 118 may complete the associated transaction based on a comparison of the authorization responses 606 to the authorization requirement. In the illustrated example, the approval of both of the authorizing parties may be required to implement the transaction.

It is to be recognized and understood that the examples above are illustrative and not exhaustive. It is further to be understood that the principles described in each example may be combined between examples. For instance, a consolidated transaction request may be transmitted to multiple authorizing parties, the transacting party may be one of multiple authorizing parties, and so forth.

Flowchart

Figure 7:
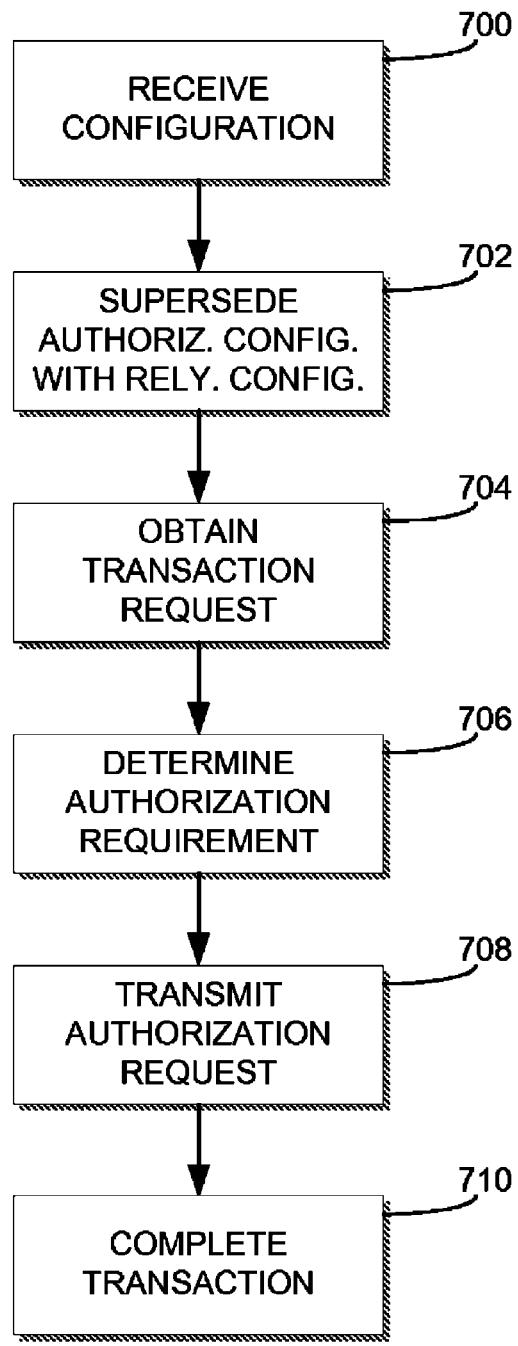
FIG. 7 is a flowchart for authentication policy orchestration, in an example embodiment.

FIG. 7 is a flowchart for authentication policy orchestration, in an example embodiment.

At operation 700, a configuration of at least one of a plurality of authorization policies is received via the network from at least one of the relying party and the authorizing party, wherein at least one of the plurality of authorization policies is configurable by the relying party and not configurable by the authorizing party.

At operation 702, a configuration of at least one of the plurality of authorization policies from at least one of the relying party and the authorizing party is received, wherein a configuration of at least one of the plurality of authorization policies by the relying party supersedes a configuration of the at least one of the plurality of authorization policies by the authorizing party.

At operation 704, a transaction request for a transaction is obtained from a client device via a network.

At operation 706, an authorization requirement for the transaction request is determined by a processor based, at least in part, on a plurality of authorization policies, individual ones of the plurality of authorization policies being separately configurable by at least one of a relying party and an authorizing party. In an example, the authorization requirement is for authorization of the transaction by the authorizing party, and further comprising. In an example, the plurality of authorization policies include at least two of: requiring multiple authorizing parties; a status of a user device; multiple transacting parties; multiple client devices; providing a notification of the transaction instead of the authorization request; a location of at least one of the client device and the user device; a transaction amount; a status of the network; an availability of a security token; provision of biometric information; provision of a personal identification number (PIN); an authorization request message delivery mechanism; a habit of at least one of the transacting party and the authorizing party; a transaction context; proximity; a transaction risk factor; and a method of providing an authorization response from the user device.

At operation 708, an authorization request is transmitted via the network to a user device different from the client device based, at least in part, on the authorization requirement.

At operation 710, the transaction is completed with the processor based on the authorization requirement having been met. In an example, completing the transaction is based on having received an authorization approval from the user device in response to the authorization request. In an example, completing the transaction is by rejecting the transaction upon receiving an authorization rejection in response to the authorization request. In an example, the authorization requirement is an automatic authorization of the transaction and wherein completing the transaction is without input from the authorizing party. In an example, the authorization requirement is an automatic rejection of the transaction and wherein completing the transaction without input from the authorizing party.

System

Figure 8:
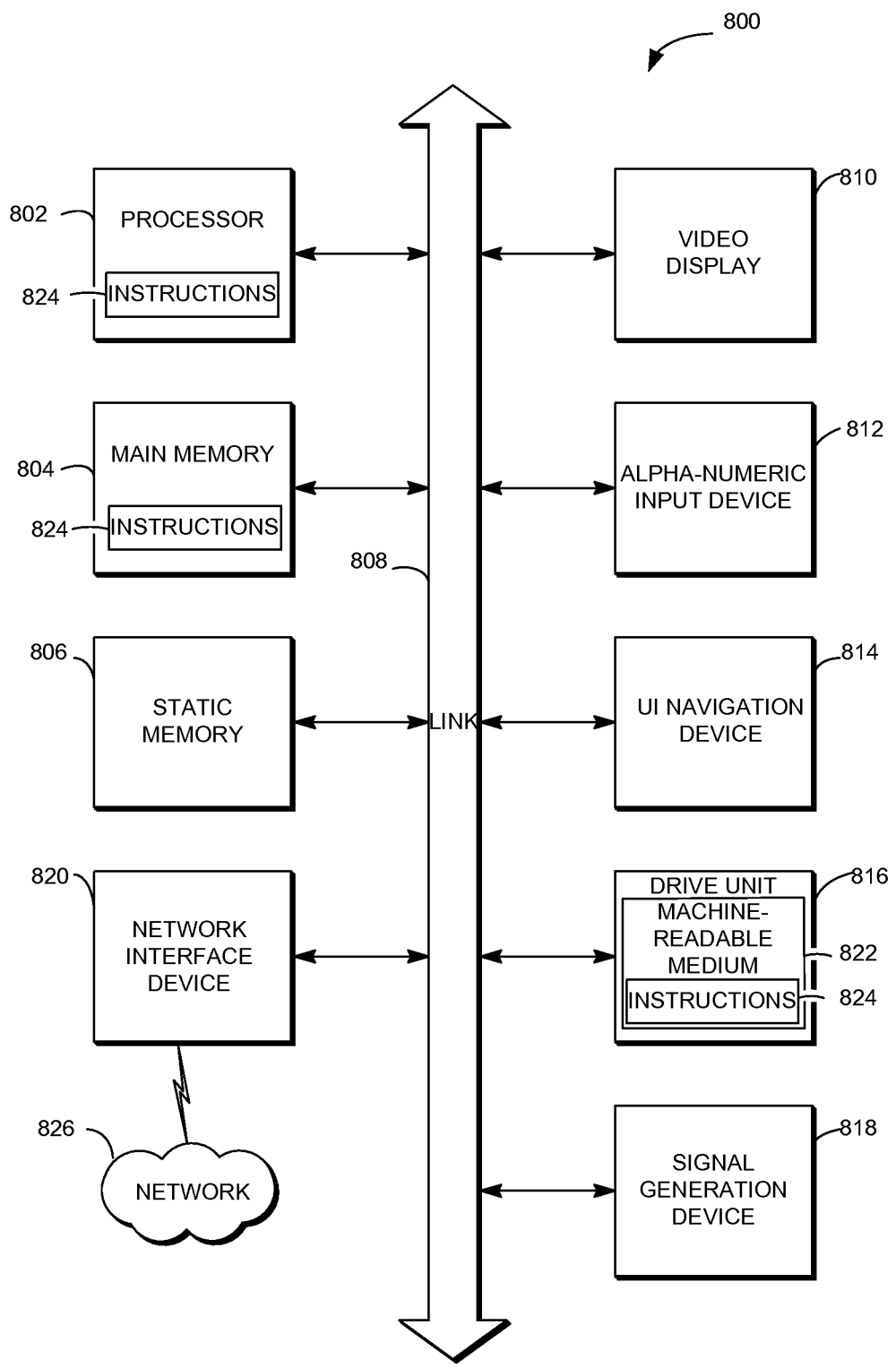
FIG. 8 is a block diagram illustrating components of a machine able to read instructions from a machine-readable medium.

FIG. 8 is a block diagram illustrating components of a machine 800, according to some example embodiments, able to read instructions from a machine-readable medium (e.g., a machine-readable storage medium) and perform any one or more of the methodologies discussed herein. Specifically, FIG. 8 shows a diagrammatic representation of the machine 800 in the example form of a computer system and within which instructions 824 (e.g., software) for causing the machine 800 to perform any one or more of the methodologies discussed herein may be executed. In alternative embodiments, the machine 800 operates as a standalone device or may be connected (e.g., networked) to other machines. In a networked deployment, the machine 800 may operate in the capacity of a server machine or a client machine in a server-client network environment, or as a peer machine in a peer-to-peer (or distributed) network environment. The machine 800 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 824, sequentially or otherwise, that specify actions to be taken by that machine. Further, while only a single machine is illustrated, the term "machine" shall also be taken to include a collection of machines that individually or jointly execute the instructions 824 to perform any one or more of the methodologies discussed herein.

The machine 800 includes a processor 802 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 804, and a static memory 806, which are configured to communicate with each other via a bus 808. The machine 800 may further include a graphics display 810 (e.g., a plasma display panel (PDP), a light emitting diode (LED) display, a liquid crystal display (LCD), a projector, or a cathode ray tube (CRT)). The machine 800 may also include an alphanumeric input device 812 (e.g., a keyboard), a cursor control device 814 (e.g., a mouse, a touchpad, a trackball, a joystick, a motion sensor, or other pointing instrument), a storage unit 816, a signal generation device 818 (e.g., a speaker), and a network interface device 820.

The storage unit 816 includes a machine-readable medium 822 on which is stored the instructions 824 (e.g., software) embodying any one or more of the methodologies or functions described herein. The instructions 824 may also reside, completely or at least partially, within the main memory 804, within the processor 802 (e.g., within the processor's cache memory), or both, during execution thereof by the machine 800. Accordingly, the main memory 804 and the processor 802 may be considered as machine-readable media. The instructions 824 may be transmitted or received over a network 826 via the network interface device 820.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 822 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., software) for execution by a machine (e.g., machine 800), such that the instructions, when executed by one or more processors of the machine (e.g., processor 802), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A server, comprising:
   a network interface configured to be communicatively coupled to a network utilizing a secure communication protocol;
   at least one hardware processor configured to:
      direct a plurality of authorization policies which are separately configurable between those received from a relying party policy engine located on the server and those received from an authorizing party policy engine located on a authorizing party user device and control authorization requirements of the authorizing party user device being sent authorization requests;
      obtain, from a client device via the network, a transaction request for a transaction;
      determine the authorization requirement for the transaction request based on the plurality of authorization policies;
         a first policy of the plurality of authorization policies being configurable by the relying party policy engine but not the authorizing party policy engine;
         a second policy of the plurality of authorization policies being configurable by the authorizing party policy engine;
         a third policy of the plurality of authorization policies being configurable by the authorizing party policy engine, and authorizing completion of the transaction without input from the authorizing party user device based on automatic authorization criterion; and
         a fourth policy of the plurality of authorization policies being based on risk factors related to the transaction and configurable by the relying party policy engine or the authorizing party policy engine;
      wherein the plurality of authorization policies include: a status of the authorizing party user device, providing a notification of the transaction, a location of at least one of the client device and the authorizing party user device, a status of the network, and a habit of at least one of the client device and the authorizing party user device;
      determine that the automatic authorization criterion has not been met;
      based on the determination that the automatic authorization criterion has not been met, transmit a respective authorization request to the authorizing party user device;
      receive at least one authorization response per transaction request from the authorizing party user device; and
      complete the transaction by approving the transaction based on the authorization requirement having been met and based on having received an authorization approval in each of the authorization responses.

2. The server of claim 1:
   wherein the authorization requirement is for authorization of the transaction by the authorizing party user device;
   wherein the hardware processor is further configured to transmit, via the network, an authorization request to an other authorizing party user device different from the client device based, at least in part, on the authorization requirement; and
   wherein the hardware processor is further configured to complete the transaction based on having received an authorization approval from the other authorizing party user device in response to the authorization request.

3. The server of claim 2, wherein the hardware processor is further configured to complete the transaction by rejecting the transaction upon receiving an authorization rejection in response to the authorization request.

4. The server of claim 1, wherein the plurality of authorization policies include at least two of: requiring multiple other authorizing party devices; multiple transacting party devices; multiple client devices; a transaction amount; an availability of a security token; provision of biometric information; provision of a personal identification number (PIN); an authorization request message delivery mechanism; a transaction context; a transaction risk factor; proximity; a timeout; a serial rejection of preceding transactions; and a method of providing an authorization response from the authorizing party user device.

5. The server of claim 1, wherein the transaction is at least one of a monetary transaction, an attempt to access a physical location, an attempt to utilize personal information, and an attempt to access electronic data.

6. The server of claim 1, wherein the authorization requirement is for authorization of the transaction by all of a plurality of authorizing party user devices.

7. The server of claim 1, wherein the authorization requirement is for authorization of the transaction by at least one but fewer than all of a plurality of authorizing party user devices.

8. The server of claim 1, wherein the second policy requires a first authorization mechanism for the authorizing party user device and a second authorization mechanism for an other authorizing party user device, the first authorization mechanism being different from the second authorization mechanism.

9. The server of claim 1, wherein the hardware processor is further configured to:
   determine that an authorization is not required by the authorizing party user device; and
   transmit a notification of the transaction to the authorizing party user device based on authorization not being required by the authorizing party user device.

10. The server of claim 1, wherein at least one of the first, second, and third policies specifies at least one of a predetermined transacting party and a predetermined client device and wherein the hardware processor is configured to automatically reject the transaction based on a transacting party and/or a client device related to the transaction not being the at least one of the predetermined transacting party and the predetermined client device.

11. The server of claim 1, wherein an authorizing party input to meet the authorization requirement for the authorization approval is stored on the authorizing party user device.

12. The server of claim 11, wherein an authorizing party input is one from the group consisting of: biometric, habits, and PIN code stored on the authorizing party user device.

13. The server of claim 1, wherein the first, second or third policy is a context policy.

14. The server of aim 1, wherein the first, second or third policy is a habit policy.

15. The server of claim 1, wherein the plurality of authorization policies require multiple authorizing party user devices.

16. The server of claim 1, wherein the first, second or the third policy is a context policy and the plurality of authorization policies require multiple authorizing party user devices.

17. A system, comprising:
a network interface configured to be communicatively coupled to a network utilizing a secure communication protocol;
a hardware processor to execute a policy engine configured to:
direct a plurality of authorization policies which are separately configurable between those received from a relying party policy engine located on a server and those received from an authorizing party policy engine located on an authorizing party user device and control authorization requirements of the authorizing party user device being sent authorization requests;
obtain, from a client device via the network, a transaction request for a transaction; and
determine the authorization requirement for the transaction request based on the plurality of authorization policies;
a hardware-implemented information engine comprising a processor and instructions executing on the processor, configured to receive a configuration of at least one of the plurality of authorization policies;
a first policy of the plurality of authorization policies being configurable by the relying party server policy engine but not the authorizing party policy engine;
a second policy of the plurality of authorization policies being configurable by the authorizing party policy engine, the first policy taking precedence over the second policy; and
a third policy of the plurality of authorization policies being configurable by the authorizing party policy engine, and authorizing completion of the transaction without input from the authorizing party based on an automatic authorization criterion; and
a fourth policy of the plurality of authorization policies being based on risk factors related to the transaction and configurable by the relying party policy engine or the authorizing party policy engine;
wherein the plurality of authorization policies include: a status of the authorizing party user device, providing a notification of the transaction, a location of at least one of the client device and the authorizing party user device, a status of the network, and a habit of at least one of the client device and the authorizing party user device
wherein the information engine is further configured to:
determine that the automatic authorization criterion has not been met;
based on the determination that the automatic authorization criterion has not been met, transmit a receptive authorization request to the authorizing party user device; and
receive at least one authorization response per transaction request from the authorizing party user device; and
a hardware-implemented transaction engine comprising a processor and instructions executing on the processor, configured to complete the transaction based on the authorization requirement having been met.

18. The system of claim 17, wherein:
the authorization requirement is for authorization of the transaction by the authorizing party user device,
the hardware-implemented information engine is configured to transmit, via the network, an authorization request to an other authorizing party user device which is different from the client device based, at least in part, on the authorization requirement;
wherein the hardware-implemented transaction engine is further configured to complete the transaction based on having received an authorization approval from the other authorizing party user device in response to the authorization request.

19. The system of claim 18, wherein the hardware-implemented transaction engine is further configured to complete the transaction by rejecting the transaction upon receiving an authorization rejection in response to the authorization request.

20. The system of claim 17, wherein the plurality of authorization policies include at least two of: requiring multiple authorizing party devices; multiple transacting party devices; multiple client devices; a transaction amount; an availability of a security token; provision of biometric information; provision of a personal identification number (PIN); an authorization request message delivery mechanism; proximity; a timeout; a serial rejection of preceding transactions; a transaction risk factor; and a method of providing an authorization response from the authorizing party user device.

21. The system of claim 17, wherein the authorization requirement is for authorization of the transaction by all of a plurality of authorizing party user devices.

22. The system of claim 17, wherein the authorization requirement is for authorization of the transaction by at least one but fewer than all of a plurality of authorizing party user devices.

23. The system of claim 17, wherein the second policy requires a first authorization mechanism for the first authorizing party device and a second authorization mechanism for an other authorizing party user device, the first authorization mechanism being different from the second authorization mechanism.

24. The system of claim 17, wherein the information engine is further configured to:
determine that an authorization is not required by the authorizing party user device; and
transmit a notification of the transaction to the authorizing party user device based on authorization not being required by the authorizing party user device.

25. The system of claim 17, wherein at least one of the first, second, and third policies specifies at least one of a predetermined transacting party and a predetermined client device and wherein the information engine is configured to automatically reject the transaction based on a transacting party and/or a client device related to the transaction not being the at least one of the predetermined transacting party and the predetermined client device.

26. An authorizing party user device, comprising:
   a network interface configured to be communicatively coupled to a network;
   a hardware processor configured to obtain, from a server via the network utilizing a secure communication protocol, an authorization request associated with a transaction request for a transaction, the authorization request being based, on a plurality of authorization policies, individual ones of the plurality of authorization policies being separately configurable by at least one of a relying party policy engine located on the server and an authorizing party policy engine located on an authorizing party user device,
      a first policy of the plurality of authorization policies being configurable by the relying party policy engine but not the authorizing party policy engine;
      a second policy of the plurality of authorization policies being configurable by the authorizing party policy engine;
      a third policy of the plurality of authorization policies being configurable by the authorizing party policy engine, and authorizing completion of the transaction without input from the authorizing party user device based on an automatic authorization criterion; and
      a fourth policy of the plurality of authorization policies being based on risk factors related to the transaction and configurable by the relying party policy engine or the authorizing party policy engine;
         wherein the plurality of authorization policies include:
            a status of the authorizing party user device,
            providing a notification of a transaction,
            a location of the authorizing party user device,
            a status of the network, and
            a habit of the authorizing party user device;
         determine that the automatic authorization criterion has not been met; and
         based on the determination that the automatic authorization criterion has not been met, transmit a respective authorization request to the authorizing party user device;
   a user interface configured to:
      display information associated with the authorization request; and
      obtain an authorization response from the authorizing party user device;
      wherein the hardware processor is configured to transmit the authorization response to the relying party server via the network interface based on having received an authorization approval in each of the authorization responses.

27. The user device of claim 26, wherein the user interface is further configured to obtain a configuration of at least one of the authorization policies from the authorizing party user device, wherein the authorization request is based on the plurality of authorization policies, as configured.

28. The user device of claim 26, wherein the plurality of authorization policies include at least two of: requiring multiple authorizing party devices; multiple transacting party devices; multiple client devices; a transaction amount; an availability of a security token; provision of biometric information; provision of a personal identification number (PIN); an authorization request message delivery mechanism; proximity; a timeout; a serial rejection of preceding transactions; a transaction risk factor; and a method of providing an authorization response from the authorizing party user device.

29. The user device of claim 26, wherein the authorization requirement is for authorization of the transaction by all of a plurality of authorizing party user devices.

30. The user device of claim 26, wherein the authorization requirement is for authorization of the transaction by at least one but fewer than all of a plurality of authorizing party user devices.

31. The user device of claim 26, wherein the second policy requires a first authorization mechanism for first authorization party and a second authorization mechanism for a second authorization party, the first authorization mechanism being different from the second authorization mechanism.

32. The user device of claim 26, wherein the hardware processor is further configured to:
   determine that an authorization is not required by the authorizing party user device; and
   transmit a notification of the transaction to the authorizing party user device based on authorization not being required by the authorizing party user device.

33. The authorizing party user device of claim 26, wherein at least one of the first, second, and third policies specifies at least one of a predetermined transacting party and a predetermined client device and wherein the hardware processor is configured to automatically reject the transaction based on a transacting party and/or a client device related to the transaction not being the at least one of the predetermined transacting party and the predetermined client device.

34. A method, comprising:
   obtaining, from a client device via a network, a transaction request for a transaction;
   directing a plurality of authorization policies which are separately configurable between those received from a relying party policy engine located on a server and those received from an authorizing party policy engine located on an authorizing party user device and controlling authorization requirements of the authorizing party user device being sent authorization requests, wherein a first policy of the plurality of authorization policies being configurable by the relying party policy engine but not the authorizing party policy engine, a second policy of the plurality of authorization policies being configurable by the authorizing party policy engine, a third policy of the plurality of authorization policies being configurable by the authorizing party policy engine, and authorizing completion of the transaction without input from the authorizing party user device based on an automatic authorization criterion, and a fourth policy of the plurality of authorization policies being based on risk factors related to the transaction and configurable by the relying party policy engine or the authorizing party policy engine;
   wherein the plurality of authorization policies include: a status of the authorizing party user device, providing a notification of the transaction, a location of at least one of the client device and the authorizing party user device, a status of the secure network, and a habit of at least one of the client device and the authorizing party user device;
   determining that the automatic authorization criterion has not been met;
   based on the determination that the automatic authorization criterion has not been met, transmitting a respective authorization request to the authorizing party user device;
   receiving at least one authorization response per transaction request from the authorizing party user device through a secure communication protocol; and completing, with a hardware processor at the relying party server, the transaction by approving the transaction based on the authorization requirement having been met and based on having received an authorization approval in each of the authorization responses.

35. The method of claim 34, wherein the authorization requirement is for authorization of the transaction by the authorizing party user device, and further comprising: transmitting, via the network, an authorization request to an other authorizing party user device different from the client device based, at least in part, on the authorization requirement; wherein completing the transaction is based on having received an authorization approval from the other authorizing party user device in response to the authorization request.

36. The method of claim 35, wherein completing the transaction is by rejecting the transaction upon receiving an authorization rejection in response to the authorization request.

37. The method of claim 34, wherein the plurality of authorization policies include at least two of: requiring multiple authorizing party devices; multiple transacting party devices; multiple client devices; a transaction amount; an availability of a security token; provision of biometric information; provision of a personal identification number (PIN); an authorization request message delivery mechanism; a transaction context; proximity; a transaction risk factor; and a method of providing an authorization response from the authorizing party user device.

38. The method of claim 34, wherein the authorization requirement is for authorization of the transaction by all of a plurality of authorizing party user devices.

39. The method of claim 34, wherein the authorization requirement is for authorization of the transaction by at least one but fewer than all of a plurality of authorizing party user devices.

40. The method of claim 34, wherein the second policy requires a first authorization mechanism for the first authorizing party user device and a second authorization mechanism for an other authorizing party user device, the first authorization mechanism being different from the second authorization mechanism.

41. The method of claim 34, further comprising:
   determining that an authorization is not required by the authorizing party user device; and
   transmitting a notification of the transaction to the authorizing party user device based on authorization not being required by the authorizing party user device.

42. The method of claim 34, wherein at least one of the first, second, and third policies specifies at least one of a predetermined transacting party and a predetermined client device and further comprising automatically rejecting the transaction based on a transacting party and/or a client device related to the transaction not being the at least one of the predetermined transacting party and the predetermined client device.

* * * * *